United States Patent
Rhodes

(10) Patent No.: US 7,603,180 B2
(45) Date of Patent: Oct. 13, 2009

(54) METHOD AND SYSTEM FOR ORTHOGONALIZING INPUT SIGNALS

(75) Inventor: Paul A. Rhodes, Palm Beach, FL (US)

(73) Assignee: Evolved Machines, Inc., Palm Beach, FL (US)

( * ) Notice: Subject to any disclaimer, the term of this patent is extended or adjusted under 35 U.S.C. 154(b) by 0 days.

(21) Appl. No.: 10/292,811

(22) Filed: Nov. 13, 2002

(65) Prior Publication Data

US 2003/0167289 A1    Sep. 4, 2003

Related U.S. Application Data

(60) Provisional application No. 60/331,233, filed on Nov. 13, 2001.

(51) Int. Cl.
- *G06E 3/00* (2006.01)
- *G06F 15/18* (2006.01)
- *G01N 31/00* (2006.01)
- *G05B 13/02* (2006.01)
- *G05B 15/00* (2006.01)

(52) U.S. Cl. .............................. 700/1; 702/22; 702/27; 706/20; 700/48

(58) Field of Classification Search ..................... 700/1; 382/190, 156; 702/24–28; 706/1, 20
See application file for complete search history.

(56) References Cited

U.S. PATENT DOCUMENTS

| | | | | |
|---|---|---|---|---|
| 4,766,551 A | * | 8/1988 | Begley ........................ | 702/28 |
| 4,818,348 A | * | 4/1989 | Stetter ........................ | 205/780 |
| 4,847,783 A | * | 7/1989 | Grace et al. ................... | 702/24 |
| 4,958,295 A | * | 9/1990 | Davidson et al. .............. | 702/25 |
| 5,106,756 A | * | 4/1992 | Zaromb ....................... | 436/161 |
| 5,239,483 A | * | 8/1993 | Weir ........................... | 702/27 |
| 5,263,097 A | * | 11/1993 | Katz et al. .................... | 382/190 |
| 5,701,398 A | * | 12/1997 | Glier et al. ..................... | 706/41 |
| 6,384,841 B1 | * | 5/2002 | Lebovitz et al. ............... | 345/642 |
| 6,594,382 B1 | * | 7/2003 | Woodall ...................... | 382/156 |

* cited by examiner

*Primary Examiner*—Albert DeCady
*Assistant Examiner*—Sunray R Chang
(74) *Attorney, Agent, or Firm*—Fish & Richardson P.C.

(57) ABSTRACT

A method for the orthogonalization of initially overlapping vectors, the uses for which include the re-encoding and decoding of representations triggered by sensory arrays.

18 Claims, 2 Drawing Sheets

METHOD AND SYSTEM FOR ORTHOGONALIZING INPUT SIGNALS

CLAIM OF PRIORITY

This application claims priority to U.S. Patent Application Ser. No. 60/331,233, filed on Nov. 13, 2001, the entire contents of which are hereby incorporated by reference.

TECHNICAL FIELD

This invention relates to a method and apparatus for orthogonalizing input signals.

BACKGROUND

Associative recall is a process by which a presented image, i.e. a cue, triggers a reactivation of the internal representation of an associated image. The associated "image" may be in any sense modality or more abstract, and it may be triggered by external sensory information or internal broadcast. Since by this process a presented image evokes a memory of what has accompanied it before, associative recall can be intertwined with prediction, and hence the automatic transformation of sensory input into motor output.

However, a difficulty in implementation of associative recall in neural systems, whether artificial or biological, arises due to a common aspect of the initial encoding of external objects by biological sensory arrays: the initial encoding of an object (whether it be a smell or visual image) by simple "feature sensors" often entails considerable overlap between the patterns encoding fundamentally different objects. Thus the presentation of an apple or a rock of similar size and shape may trigger very similar patterns of initial activation in the retina and in the primary visual sensory area, and yet of course require very different motor reactions. Similarly, the pattern of activation in the olfactory epithelium and in the olfactory bulb evoked by two distinct odorants which differ by a single molecular motif will considerably overlap, and yet can be associated with two substances of different import, one edible the other poisonous.

SUMMARY

A method for the orthogonalization of initially overlapping vectors, the uses for which include the re-encoding and decoding of representations triggered by sensory arrays. Application areas include sensori-motor controllers and content-addressable associative memory devices, signal processing, chemical analysis and identification, neural networks, artificial intelligence, computer process control, optical identification, and any other area where multiple overlapping input signals are processed.

Biological systems and models that describe such systems suggest solutions to these problems in discriminating overlapping inputs which are fundamentally different than conventional signal processing approaches. A method for transforming overlapping sensory signal patterns is suggested by the architecture and neuronal properties of olfactory cortex. It is a systematic procedure for the transformation of patterns representing the initial sensory array response to distinct objects, which may be initially highly overlapping, into a more orthogonalized recoding enabling discrimination between objects of different identity, and hence more useful for triggering appropriate response.

In general, any biological system or artificial device which possess sensory arrays triggering internal representations of the external world and which uses those representations to ultimately drive action must be capable of responding differently to objects with overlapping sensory representations but different identity. Experimental observations of the brains of a variety of animals suggest biological neural systems often transform the initial sensory representation of objects into a more useful and orthogonalized recoding, where overlap between patterns becomes more directly associated with similarity in object identity and may therefore be more appropriately linked to motor response. An example of a biological system where this capability has been developed and refined is in the olfactory system of vertebrates, wherein a transformation occurs from the coding of odors in the olfactory receptors to the much more odorant-specific recoding in the array of pyramidal cells in the olfactory cortex. The recoding into subsets transforms the representation from that of primary features, which may be often overlapping even for distinct objects, into a recoding in higher order features, each associated with the joint presence of a set of primary features.

Multiple input signals can be processed by orthogonalizing the input signals into simple associated subsets. The associated subsets contain information needed to sort and process the more complex input signals. Similar features in the multiple input signals are used to group the inputs into subsets. The input signals can be transformed into the subsets, some of which are activated in association with the input signal. Layers of subsets, for example three or more layers of subsets, lead to the incorporation of information relating to the input signals into the associated subsets. The information can be used to transform new input signals and process the signals by orthogonalization into preexisting associated subsets.

For example, a primitive three-layer cortex orthogonalizes overlapping sensory representations of distinct objects. The topographic nature of sensory arrays used to detect the representations causes the initial representation of different objects to be highly overlapping in primary sensory cortices. This can lead to retinal patterns encoding two round objects of similar size and shape in the same place to overlap, even if one is food and the other a rock. However, these objects are distinct and the initially encoded by overlapping distributed activity patterns eventually trigger appropriately specific motor responses. The architecture of 3-layer reptilian, hippocampal and piriform cortex is suited to transform overlapping patterns of afferent input into a more orthogonal form. In three-layer cortical systems, layer one is composed of a plexus of horizontal afferent fibers that intersect with the branches of pyramidal cells, so that each dendritic branch samples a subset of afferent fibers. If the branches are electrically active, then the joint activity in a subset of input fibers can fire a regenerative event restricted to a branch, with cell firing triggered by the joint firing of a set of branches. In this manner, pyramidal cells in a three-layer cortex recode an afferent stream into the firing of an array of detectors of sets of active subsets. Simulations of compartment model pyramidal neurons demonstrate that this architecture orthogonalizes overlapping input patterns. An area-to-area cascade of such transformations iterates the orthogonalization. The results support the possibility that a three-layer cortical architecture quickly transforms the initial sensory representation into an orthogonalized recoding suited to drive associative recall, prediction, and therefore appropriate motor action.

In one aspect, a system for processing multiple input signals includes an initial array of detectors organized to detect an array of "features" (e.g., information) from the multiple input signals, and a second array consisting of a group of detectors of subsets of features associated with the initial array of information, the arrays being layered.

In another aspect, a method of processing multiple input signals includes detecting multiple input signals, and recoding the input signals with a subset of detectors to orthogonalize the input signals utilizing associated subsets of their features. The method can include distinguishing the individual signals based upon the associated subsets.

In another aspect, a method of processing linearly inseparable input signals includes detecting an array of sensor information about the input signals using an array of sensors, recoding the original sensor information into subsets of associated primary inputs, and distinguishing the individual signals based upon the unique subsets associated with each input. The method can include organizing the subsets based on frequently active patterns in a higher order feature space.

In certain circumstances, the input signals overlap. The input signals can be orthogonalized into associated subsets that separate the signals into higher order features. A higher order feature can be associated with each subset.

In another aspect, a system for processing multiple input signals includes an array of detectors organized to collect an array of information from the multiple input signals, and a processor for orthogonalizing the collected information into an array of associated subsets. The array of information can be transferred to the processor via at least one input device. The processor can organize the subsets in the database, or can extrapolate an identity of the signal based upon the unique subsets. The system can include a computer memory wherein the processor creates a database of frequently activated patterns of subsets, a database of correct and incorrect extrapolations and distinguishing subsets between the correct and incorrect extrapolations, at least one output device configured to be driven by the processor, or combinations thereof.

The details of one or more embodiments are set forth in the accompanying drawings and the description below. Other features, objects, and advantages of the invention will be apparent from the description and drawings, and from the claims.

DETAILED DESCRIPTION

The method consists of an algorithm implementing a transformation of an array of values triggered by presentation of an object in a "primary" sensory receptive array, into a new pattern of activity across a subsequent "secondary" array. The method entails a recoding of the original sensory input pattern into a new pattern, each element of which is activated by a subset of the inputs in the primary array. If the primary array codes the raw features of the "object"(i.e. the molecular motifs of an odorant, or the edges of a visual object) then each detector in the new array responds to the conjoint presence (as that is later defined) of a set of features in primary array. Each element can be viewed in the higher array as representing a "higher order" feature of the sensory object, corresponding to the joint presence of a set of primary features. The elements of the secondary array thus contains elements each of which are activated by a subset of the entries of the original input vector, and the new array recodes the original activity pattern into the distribution of activity in a set of subset detectors.

The subset of primary features triggering an element in the secondary array may be randomly selected from the entries of the primary array. However, given the combinatorial explosion involved in recoding n-tuples of feature space, for complex sensory environments the system will include a mechanism to more completely encode the higher order features that actually occur in the environment, using a self-organizing (i.e. unsupervised) mechanism as described below.

Figure 1:
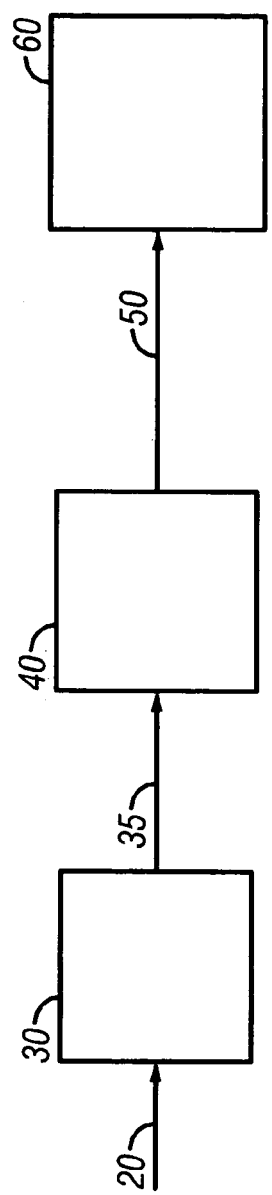
FIG. 1 is a block diagram of a system for processing multiple overlapping input signals.

FIG. 1 is a block diagram of a system for processing overlapping input signals. Multiple overlapping input signals 20 are detected using an array of detectors 30 that detects primary features of each signal. The primary feature signals 35 are orthogonalized 40 into associated subsets 50 of the primary features representing higher order features. Once they have been associated into subsets, the signals can be distinguished 60 from each other.

Figure 2:
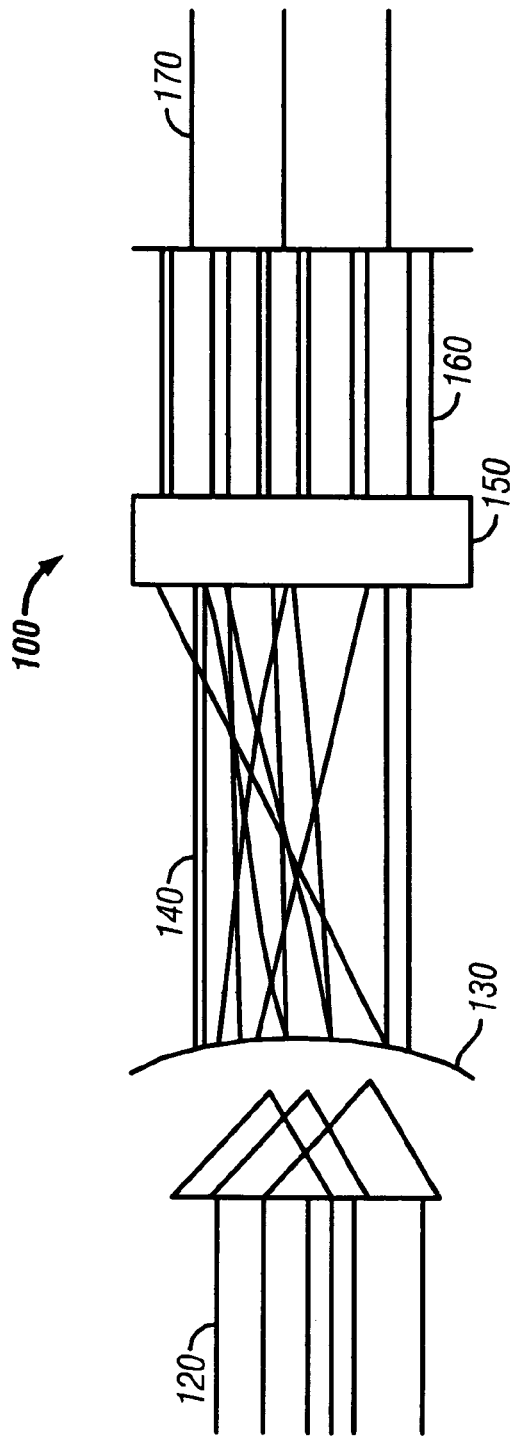
FIG. 2 is a diagram of a system for identifying three overlapping input signals.

FIG. 2 is a representation of a system 100 for identifying three overlapping signals. Overlapping input signals 120 can be detected by a system of arrays 130 that separate the signals according to their primary features. At this level the primary feature signals 140 overlap with each other indicating similarities at the primary feature level between the three input signals. The primary signals can be further processed into arrays by orthogonalization 150 with the resultant arrays occurring as associated subsets 160 of the primary features. These associated subsets are then used to distinguish the three original input signals 170. The associated subsets can be stored as information or used to select an output, such as a visual, audible or motor response. It is important to note that the process works for any number or type of overlapping input signals and for any number or type of measurement arrays. Three signals were chosen in this example for demonstration only.

A system for processing multiple input signals can be made up of an array of detectors to collect an array of information from the multiple input signals. The array of detectors can include any type of detector for measuring a feature of an input. For example the array could include a spectrophotometer for observing transmission and absorbance of light at different wavelengths, or the array could include a scale for measuring weight, or a ruler for measuring any of the three dimensions height, width, or depth. Such an array could include radiation detectors, waveform detectors. The sensors can measure any physical property of an object or portion of an object, such as mass, volume, charge, surface area, magnetic field strength, or emission or absorbance of any range of electromagnetic energy. Once measured by the sensor, the data can be placed into a group of layered subsets that can represent higher ordered features. For example, if mass and volume of multiple input signals are measured then an associated subset could be density or mass per unit volume. Thus two items with the same mass but different volume would no longer overlap.

A method of processing multiple input signals includes detecting multiple input signals and orthogonalizing the input signals into associated subsets. The method can include the additional step of distinguishing the individual signals based upon the associated subsets. The input signals can be overlapping, and the step of orthogonalizing the input signals can separate the signals into higher order features. Orthogonalizing the input signals can include taking signals representing primary features of the multiple inputs that are readily measurable or detectable and associating the signals in such a way as minimize the overlap of features of the original input signals. This process can, but does not have to, involve using higher order features of the individual signals to separate the signals. In other words the associated subsets can represent meaningful physical parameters derived from the primary features detected, but they do not have to be meaningful.

A method for processing and separating linearly inseparable input signals includes detecting an array of information about the input signals using an array of detectors, then recoding the original sensor information into subsets of associated primary inputs, and then using the unique subsets associated with each input to distinguish and define the individual signal. This method can include self-organizing the subsets based on frequently active patterns in the higher order feature space. In other words, as the method is repeated subsets of primary features can be identified that tend to result in quicker discernment of the individual signal patterns and these can be used first in the attempt to identify the signals.

The system and method can be used in any situation where multiple input signals are received or used. It is especially useful in separating overlapping input signals.

The system can be a computer system. The computer system can include an input device, an output device, a computer memory, a computer-readable storage device, and a processor. The processor is coupled to the computer memory and the computer-readable storage device and is configured to orthogonalize inputs. The inputs can be orthogonalized using hardware (i.e., within a microprocessor or microcontroller) or embodied in software disposed, for example, in a computer usable (e.g., readable) medium configured to store the software (i.e., a computer readable program code). The program code causes the enablement of the functions or fabrication, or both, of the systems and techniques disclosed herein. For example, this can be accomplished through the use of general programming languages (e.g., C, C++), hardware description languages (HDL) including Verilog HDL, VHDL, AHDL (Altera HDL) and so on, or other available programming and/or circuit (i.e., schematic) capture tools. The program code can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the code can be transmitted over communication networks including the Internet and intranets.

The system can be in the form of a software application running on any processing device, such as, a general-purpose computing device, a personal digital assistant (PDA), a special-purpose computing device, a laptop computer, a hand-held computer, or a network appliance. The system may access programs and/or data stored on a storage medium (e.g., video cassette recorder (VCR) tape or digital video disc (DVD); compact disc (CD); or floppy disk). Additionally, various implementations may access programs and/or data accessed stored on another computer system through a communication medium including a direct cable connection, a computer network, a wireless network, a satellite network, or the like.

Figure 3:
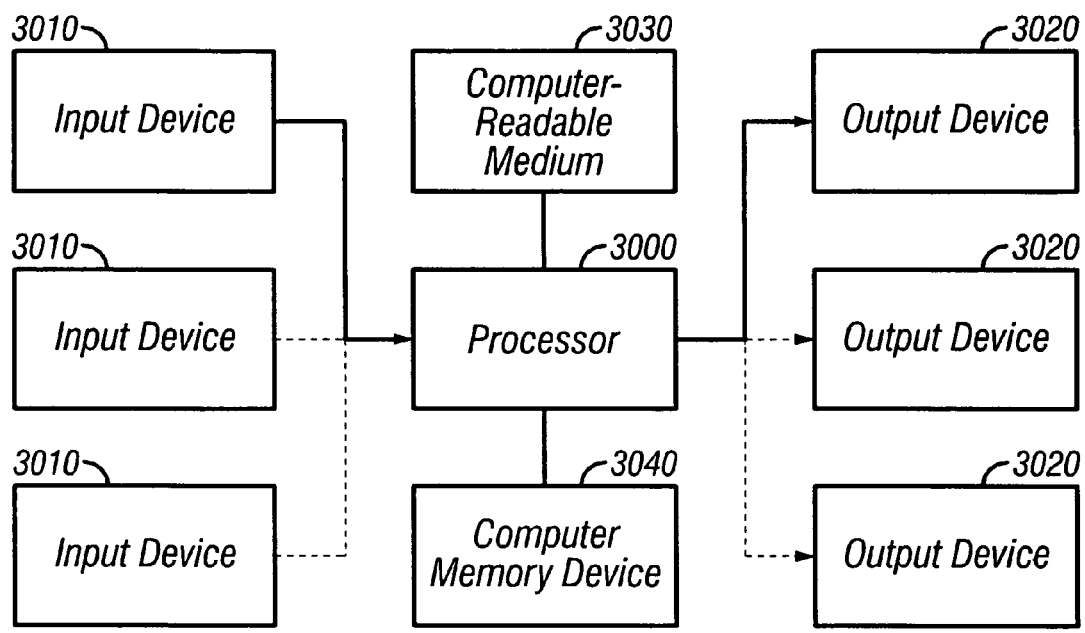
FIG. 3 is a block diagram representing a system.

Referring to FIG. 3, a system may be implemented using a hardware configuration including a processor 3000, one or more input devices 3010, one or more output devices, a computer-readable medium 3030, and a computer memory device 3040. The processor 3000 may be implemented using any computer processing device, such as, a general-purpose microprocessor or an application-specific integrated circuit (ASIC). Processor 3000 is integrated with input/output (I/O) devices to provide a mechanism to receive sensor data and/or input data and to provide a mechanism to display or otherwise output queries and results to a service technician. Input device 3010 may include, for example, one or more of the following: a mouse, a keyboard, a touch-screen display, a button, a sensor, and a counter.

Output device 3020 may be implemented using any output technology, including a liquid crystal display (LCD), a television, a printer, a light emitting diode (LED), a speaker, or a motorized output device (such as a robot or vehicle). The computer-readable medium 3030 provides a mechanism for storing programs and data either on a fixed or removable medium. The computer-readable medium 3030 may be implemented using a conventional computer hard drive, or other removable medium. Finally, the system uses computer memory device 3040, such as a random access memory (RAM), to assist in operating the demonstration system.

Additional input devices 3010 and output devices 3020 may include a chemical sensor, a temperature sensor, a hardness sensor, an artificial nose, a camera (such as a digital camera), a mouse, a keyboard, a virtual reality glove, a virtual reality helmet, a touch-screen display, gloves, helmets with heads-up displays, a computer display (e.g., liquid crystal display (LCD) panel or active matrix display), a printer, or a light-emitting diode (LED), a speaker, or headphones, or combinations thereof.

In one general example of the system and method, consider a primary representation consisting of the output of N sensors, which for simplicity may initially be assumed to take on the values 0 or 1 depending upon the presence of an individual feature in the sensory environment. The external property associated with such a feature depends upon the nature of the sensory information and the properties of the sensor; for the visual system such sensors in the retina report small spots of light, whereas in the olfactory processing system they report the presence of a particular molecular motif on the surface of a molecule. An image in the primary sensory array consists of a pattern of activation (1's) of certain of these sensors.

If the sensory patterns triggered by two distinct objects, represented by the vectors A and B, each have m of the N entries active (value 1), and differ in d of their m active entries, then the linear overlap between them is (m-d)/m. If this overlap is high, as it often is in the initial responses of biologically inspired sensory arrays, the discrimination of the objects encoded by the two vectors is confounded by any linear system. The patterns are said to be "linearly inseparable".

Now consider a new array, each element of which is a detector of a t-plet of co-active elements of the sensory pattern. There are $$\frac{(N \cdot (N-1) \cdots (N-t))}{t!}$$

such distinct t-plets.

To establish that a re-encoding of a feature space into activity in an array of higher order features orthogonalizes, one may count up how may elements of the higher order array are unique to each of the patterns A and B described above. They each contain m active elements, of which d are unique. The t-plets which they trigger which are not shared by the other can be enumerated as follows:

$$\text{Distinct detectors} = \sum_{i=1}^{d} \frac{(m-1) \cdot (m-i) \cdots (m-i-(t-2))}{(t-1)!}$$

with the caveat that the sum over I runs up to d so long as i≦m−t+1.

Since the number of detectors triggered in the higher array, by each pattern, is the number of t-plets which can be made out of their m active elements:

$$\text{Detectors activated} = \frac{(m \cdot (m-1) \cdots (m-(t-1)))}{t!}$$

then the percentage detectors triggered in the secondary array which are distinct is:

Distinct detectors/Detectors activated =

$$t \cdot \frac{\sum_{i=1}^{d, i \leq m-i+1} ((m-i) \cdot (m-i-1) \cdots (m-i-(t-2)))}{m \cdot (m-1) \cdots (m-(t-1))}$$

If this quantity expresses the percentage of detectors that differ between the patterns activated in the higher area by the two primary patterns A and B, then the sought-after percentage of overlap between the two patterns in the secondary array is:

$$1 - t \cdot \frac{\sum_{i=1}^{d, i \leq m-i+1} ((m-i) \cdot (m-i-1) \cdots (m-i-(t-2)))}{m \cdot (m-1) \cdots (m-(t-1))}$$

Using this formula, following is an example illustrating that there is indeed an orthogonalization achieved by the recoding of the pattern of activity in a primary feature array into that activated in a secondary array of higher order features each representing a co-active subset of primary features.

The following example is representative. Consider two patterns of 6 active elements each, which differ by 3, so that their linear overlap is 50%. The feature set from which they are drawn thus contains (at least) 9 distinct features. If these patterns are recoded into an array of co-activated triplets, then each triggers the activation of $$\frac{(6 \cdot (6-1) \cdot (6-(3-1)))}{3!} = 20$$

triplet detectors. To determine the number of different elements, the number of distinct detectors is calculated as follows.

$$\text{Distinct detectors} = \sum_{i=1}^{d} \frac{(m-1) \cdot (m-i) \cdots (m-i-(t-2))}{(t-1)!}$$

$$= \frac{5 \cdot 4 + 4 \cdot 3 + 3 \cdot 2}{2} = 19$$

As a result, the overlap between the patterns in the secondary array is 20−19=1, i.e. a single detector.

At this point, it may be helpful to return to the rock and the apple analogy used previously. Assume that the six active elements are shape ("S"), weight ("W"), temperature ("T"), color ("C"), hardness ("H"), and edibleness ("E"). For an apple such elements may give inputs signals of round, 100 g, 25° C., red, soft and edible. For a rock, the elements may have inputs of round, 100 g, 25° C., gray, hard, and inedible. These two input signals have three overlaps (shape, weight, and temperature) making it more difficult to discern the difference between the two. Now the twenty recoded triplets are displayed below:

| S | S | S | S | S | S | S | S | S | S |
|---|---|---|---|---|---|---|---|---|---|
| W | W | W | W | T | T | T | C | C | H |
| T | C | H | E | C | H | E | H | E | E |
| W | W | W | W | W | W | T | T | T | C |
| T | T | T | C | C | H | C | C | H | H |
| C | H | E | H | E | E | H | E | E | E |

Of these twenty sets of triplets, only one gives the same values for both the rock and the apple (S W T). As a result, it becomes much easier to separate the identity of the two images and therefore to identify the two incoming signals. This example is a simple single layered demonstration of how the method operates. One can apply the same method to multiple-layered systems. Multiple input signals can have extremely large numbers of activated sensors with very complex overlap schemes. These can necessitate the use of multiple layers of analysis and association, beyond the simple example demonstrated here in order to ensure an accurate result.

The method can be extended and made more efficient by including an algorithm to self-organize the represented n-plets to cover the frequently active patterns in higher order feature space.

A number of embodiments invention have been described. Nevertheless, it will be understood that various modifications may be made without departing from the spirit and scope of the invention. Accordingly, other embodiments are within the scope of the following claims.

What is claimed is:

1. A system for processing multiple input signals comprising:
    a first array of detectors organized to collect an array of primary features from the multiple input signals; and
    a second array of detectors organized to transform the array of primary features into an array of higher order features, wherein a higher order feature indicates the presence of a subset of multiple primary features in the array of primary features.

2. The system of claim 1 wherein a higher order feature is activated by the presence of each primary feature in the subset corresponding to the higher order feature.

3. The system of claim 1 wherein the primary features in a subset corresponding to a higher order feature constitute a combination of primary features that actually occur in an environment from which the input signals are generated.

4. The system of claim 1 further comprising means for distinguishing the input signals based on the presence of higher order features corresponding to the input signals.

5. A method of processing multiple input signals comprising:
    detecting multiple input signals, each of which includes multiple primary features; and
    recoding the primary features of the input signals into a set of higher order features such that initially-overlapping input signals are rendered less overlapping, wherein a higher order feature indicates the presence of a subset of multiple primary features.

6. The method of claim 5 further comprising distinguishing the individual signals based upon the associated higher order features.

7. The method of claim 5 wherein the input signals overlap.

8. The method of claim 5 wherein a higher order feature corresponds to a subset of the primary features and recoding involves activating a higher order feature in response to the presence of each primary feature in the subset corresponding to the higher order feature.

9. A method of processing linearly inseparable input signals comprising:
   detecting an array of sensor information about the input signals using an array of sensors, the array of sensor information including a collection of primary features;
   recoding the original sensor information into subsets of associated primary features; and
   distinguishing the input signals based upon the recoded sensor information.

10. The method of claim 9 further comprising organizing the subsets based on frequently active patterns in a higher order feature space.

11. The method of claim 9 further comprising associating a higher order feature with each subset of primary features.

12. A system for processing multiple input signals comprising:
   an array of detectors organized to collect an array of primary features from the multiple input signals; and
   a processor configured to recode the collected array of primary features into an array of associated subsets representing a set of higher order features such that initially-overlapping input signals are rendered less overlapping, wherein a higher order feature indicates the presence of a subset of multiple primary features.

13. The system of claim 12 wherein the array of information is transferred to the processor via at least one input device.

14. The system of claim 12 further comprising a computer memory wherein the processor creates a database of frequently activated patterns of subsets.

15. The system of claim 14 wherein the processor organizes the subsets in the database.

16. The system of claim 14 wherein the processor extrapolates an identity of the signal based upon the unique subsets.

17. The system of claim 12 further comprising at least one output device configured to be driven by the processor.

18. The system of claim 12 wherein a higher order feature corresponds to a subset of the primary features and recoding by the processor involves activating a higher order feature in response to the presence of each primary feature in the subset corresponding to the higher order feature.

\* \* \* \* \*